United States Patent [19]

Broockman et al.

[11] Patent Number: 4,591,242

[45] Date of Patent: May 27, 1986

[54] OPTICAL SCANNER HAVING MULTIPLE, SIMULTANEOUS SCAN LINES WITH DIFFERENT FOCAL LENGTHS

[75] Inventors: Eric C. Broockman; Robert T. Cato; LeRoy D. Dickson, all of Raleigh, N.C.

[73] Assignee: International Business Machines Corp., Armonk, N.Y.

[21] Appl. No.: 579,634

[22] Filed: Feb. 13, 1984

[51] Int. Cl.$^4$ .............................................. G02B 26/10
[52] U.S. Cl. ................................ 350/3.71; 350/6.1; 235/457
[58] Field of Search ................... 350/3.71, 6.8, 6.5, 350/6.1, 6.7, 6.9, 6.91; 235/457, 465, 462, 467

[56] References Cited

U.S. PATENT DOCUMENTS 4,333,006  6/1982  Gorin et al. .................... 235/467
4,474,422 10/1984  Kitamura ....................... 350/6.8

OTHER PUBLICATIONS

Broockman, "Time Multiplexed Two-Beam Scanner" IBM Tech. Disc. Bulletin, vol. 24, No. 9, Feb. 1982, pp. 4841-4843.

Dickson et al., "Dual Laser Scanner for Enhancing Readability of Specularly Reflecting Labels", IBM Tech. Disc. Bull., vol. 25, No. 12, May 1983, pp. 6721-6722.

Primary Examiner—Bruce Y. Arnold
Assistant Examiner—B. S. Shapiro
Attorney, Agent, or Firm—Gerald R. Woods

[57] ABSTRACT

An optical scanner uses frequency modulation and detection techniques to produce and utilize multiple, simultaneous scan patterns in which corresponding scan lines have different focal lengths. Two or more solid state lasers are modulated at unique frequencies. The frequency modulated output beams pass through different combinations of focusing lenses and are deflected by a single beam deflecting apparatus. Light reflected from any scanned object is detected. The resulting multi-frequency signal is applied to a plurality of bandpass filters to separate the returned signal into a plurality of separately decodable signals.

10 Claims, 5 Drawing Figures

OPTICAL SCANNER HAVING MULTIPLE, SIMULTANEOUS SCAN LINES WITH DIFFERENT FOCAL LENGTHS

BACKGROUND OF THE INVENTION

The present invention relates to an optical scanner and more particularly to an optical scanner capable of generating and utilizing multiple, simultaneous scan lines which are focussed at different points in space.

Optical bar code scanners are widely used in different industries for different purposes. Such scanners are commonly used with processor-controlled point of sale systems in retail stores and supermarkets to identify goods being processed. A bar code label on an item provides input data which can be used by the system to retrieve price data, print customer receipts and update inventory records. There are many less well known applications for optical bar code scanners, such as the use of such scanners to track major components of complex products during assembly operations.

There are basically two types of optical bar code scanner systems. The first type is a hand-held system in which an operator manually moves an optical detector or wand across a bar coded label to be scanned. Signals generated by the wand are transmitted, usually via a cable, to a controller or terminal where the label information can be processed.

The second type of scanner system is a fixed head scanner. In a fixed head scanner system, an item to be detected is moved across a transparent scan window, normally in the upper surface of a stationary scanner. The scanner may, for example, be built into the checkout stand in a supermarket. Optical elements within the scanner deflect a laser beam to produce scan lines which sweep through a volume above the scan window. Light reflected from an object passing through the volume is detected. Potential label candidates are selected and decoded by electronic circuits or microprocessors within the scanner. The present invention relates to this fixed head type of scanner.

A scanner should be able to detect most labels on the first pass of each labeled product over the scanner window. If a label on a product is not successfully read, that product must be brought back across the scanner window in one or more additional passes. The additional passes or re-scans are obviously time consuming and thus harmful to productivity.

The reading performance of a scanner is affected by a number of different factors. Factors such as the print quality of the labels being scanned, the electrical characteristics of the signal detecting system and the decoding algorithms which are employed, all have an impact on reading performance.

Another factor which influences reading performance is the scan pattern generated by the scanner. To increase the chances that a randomly-oriented bar coded label will be scanned completely during a pass over the scanner window, multi-line scan patterns are used in which the lines intersect each other at angles. Such scan patterns are generated by directing a laser beam at a rotating mirror wheel or through a rotating holographic disc to cause the laser beam to be deflected in predetermined directions. Fixed arrangements of mirrors are used to change the beam paths before the beams exit from the scan window to form scan lines. Known scan patterns include non-parallel or intersecting lines and/or parallel lines displaced in space from one another.

To improve the chances that a label will be properly scanned, it is desirable to increase the number of individual scan lines in the scan pattern. With prior art systems, there is a point of diminishing returns. In such systems, the number of scan lines can be increased only by making each of the scan lines shorter. Shorter scan lines are less effective so that a pattern with many short scan lines may be no more effective overall than a pattern with fewer, longer scan lines.

Another technique for improving reading performance of a scanner is to focus the individual scan lines at different points in space relative to the scan window. Some of the scan lines will be more effective in detecting labels while those labels are still some distance from the scan window. Other scan lines will be most effective in detecting labels immediately above the scan window.

While the use of multiple focal planes can improve reading performance, the degree of improvement is still limited by the fact that only one scan line is generated at any given time.

SUMMARY OF THE INVENTION

The present invention improves scanner reading performance by increasing the effective density of a scan pattern. Two or more scan lines are generated simultaneously with each line being focussed at a different point in space. One line in one pattern might be focussed at a point far from the scan window while the corresponding, simultaneously generated line in the other scan pattern is focussed at a point nearer the scan window. The total number of scan lines can be multiplied without sacrificing the length of individual scan lines.

A scanner constructed in accordance with the present invention includes means for generating a plurality of light beams, each of which has a distinctive characteristic. The scanner further includes means for focussing each of the beams at a different predetermined focal point. Beam deflecting means are included in the path of the plurality of light beams for generating simultaneous focussed scan beams. Light reflected from an object being scanned is detected to generate a single signal which varies in accordance with the total reflected optical energy. The scanner further includes means for separating the single signal into a plurality of a constituent signals as a function of the distinctive characteristic of each of the generated light beams. Each constituent signal varies as a function of the reflected optical energy attributable to a given one of the plurality of light beams.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following technical description when read in conjunction with the accompanying drawings wherein:

TECHNICAL DESCRIPTION

Figure 1:
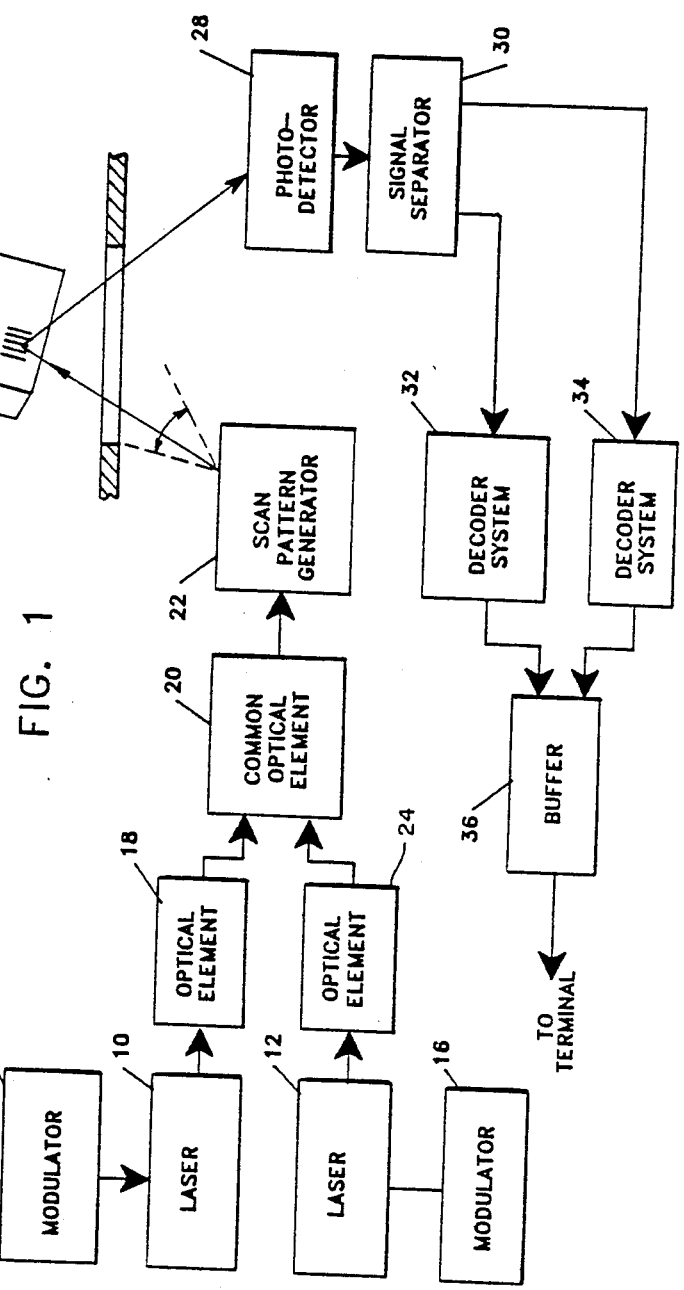
FIG. 1 is a simplified block diagram of a scanner constructed in accordance with the present invention.

Referring to FIG. 1, a scanner constructed in accordance with the present invention includes means for generating a plurality of light beams. In a preferred embodiment, this means consists of two lasers 10 and 12. The lasers 10 and 12 are driven by modulator circuits 14 and 16, respectively, which impart a distinctive characteristic to the beams produced by each of the lasers. The output beam from laser 10 is a frequency modulated beam which is transmitted through an optical element 18 and a common optical element 20 to a scan pattern generator 22. Similarly, the output beam from laser 12 is a frequency modulated beam transmitted through a different optical element 24 and the common optical element 20 to scan pattern generator 22. Optical elements 18 and 24, acting in combination with the common optical element 20, serve to focus the beams produced by lasers 10 and 12 at different focal points.

When the beams produced by lasers 10 and 12 leave common optical element 20, they may be considered as having been merged into a single, composite beam made up of two component beams, each with its own distinctive characteristic. The composite beam is deflected along a series of scan lines by scan pattern generator 22, which may be a conventional, rotating mirror wheel or a non-focusing, rotating holographic disc of the type generally shown in U.S. Pat. No. 4,416,505, which is assigned to the Assignee of the present invention. The particular type of scan pattern generator employed is not critical to the present invention.

It should be noted that the composite scan pattern produced by scan pattern generator 22 may be thought of as two or more separate but superimposed scan patterns in which corresponding scan lines are focused at different points in space.

The total amount of optical energy reflected from an object 26 being scanned is detected by a photosensitive device such as photodetector 28. The signal detected by photodetector 28 is a composite signal; that is, it includes a first component which is a function of the reflected energy attributable to laser beam 10 and a second component which is a function of the reflected optical energy attributable to the laser beam produced by laser 12. Signal separator system 30 separates the two components and applies each to one of a pair of candidate select/decoder systems 32 and 34. Candidate select/decoder systems 32 and 34 may be conventional in nature since each will operate only on a single input signal stream. Examples of suitable candidate select/decoder systems may be found in U.S. Pat. Nos. 3,909,787, 4,086,477, 4,125,765 and 4,329,574, all of which are assigned to the assignee of the present invention. The outputs of systems 32 and 34 are applied to a buffer circuit 36 which provides a single input for a point of sale terminal system where selected and decoded labels can be used for purposes mentioned earlier.

Figure 2:
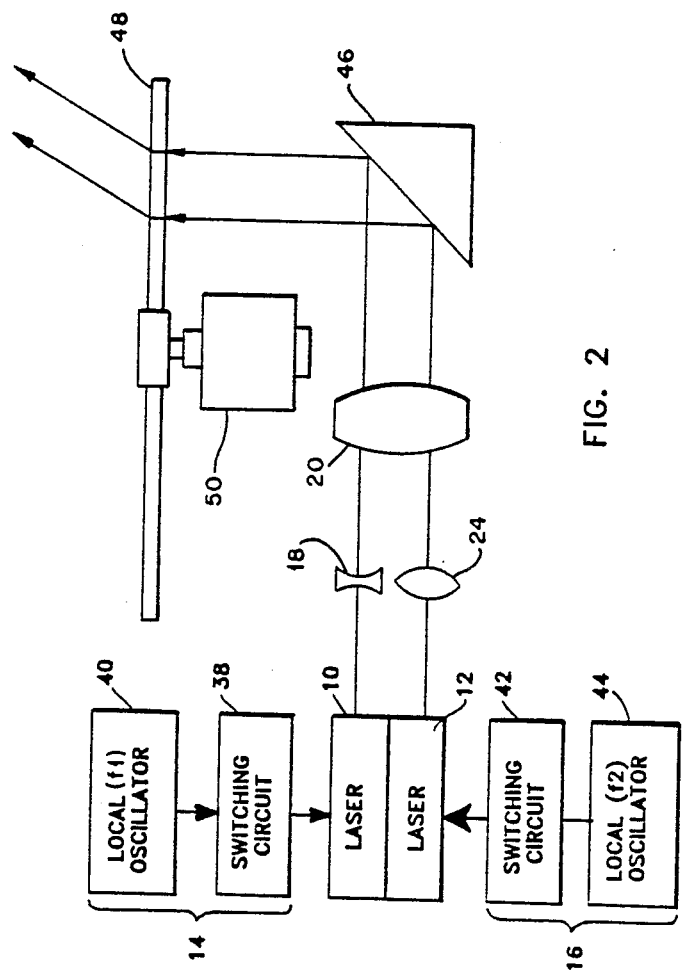
FIG. 2 is a more detailed schematic diagram of a preferred form of the apparatus for generating a plurality of light beams.

Referring to FIG. 2, solid state lasers are employed in a preferred embodiment of the present invention to generate the plurality of light beams required. The two lasers 10 and 12 are schematically represented as being contiguous, which is consistent with the physical structure of such lasers. The modulator 14 for laser 10 includes a switching circuit 38 driven by a local oscillator 40 at a given frequency f1. The switching circuit 38 simply switches laser 10 between its lasing and its non-lasing conditions at frequency f1 to provide a frequency-modulated output beam. Similarly, the modulator 16 for laser 12 consists of a similar switching circuit 42 and a local oscillator 44 which operates at a second frequency f2. The collimated, frequency modulated output of laser 10 is applied to a conventional optical lens 18 having a negative focal length. Lens 18 causes the collimated beam to diverge. The collimated, frequency modulated output of laser 12 is applied to a second conventional lens 24 which preferably has a positive focal length. Lens 24 causes the collimated beam to converge.

The diverging and converging beams are applied to the common optical element 20 which is preferably a conventional lens having a positive focal length. Lens 20 provides the same amount of focusing power for both laser beams. The laser beams transmitted through lens 20 are redirected by a mirror 46 through a rotating, multi-faceted holographic disc 48 driven at a constant speed by a conventional electrical drive motor 50. FIG. 2 shows two separate beams being deflected by the holographic disc 48 to convey the idea that two simultaneous scan lines are being produced. In practice, the two beams would be much closer together and might be considered as following a common path.

Figure 3:
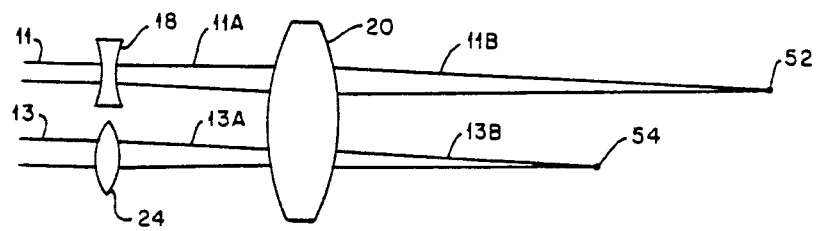
FIG. 3 is an exaggerated view of the beams generated by the apparatus of FIG. 2.

FIG. 3 is an exaggerated view showing how the optical elements cause the two collimated laser beams to be focused at different points in space. A collimated beam 11 striking lens 18 will form a diverging beam 11A. A similar collimated beam 13 impinging upon lens 24 will form a converging beam 13A. When the beams 11A and 13A pass through the lens 20, lens 20 will cause both beams to begin to converge. Because beam 11A is diverging at lens 20, the resulting beam 11B will be focused at a point 52 which is further away from lens 20 than the focal point 54 for the corresponding beam 13B, since beam 13A is converging at lens 20.

FIG. 3 indicates that the beams 11B and 13B are focused at given points without being redirected by intervening mirrors or holographic discs or other beam deflectors. In actual practice, the beams 11B and 13B are redirected and folded by the holographic disc and sets of beam-folding mirrors to form complex, multi-line scan patterns. The focal length for the beams is measured along the actual beam path. The fact that the beams are redirected after passing through lens 20 does not change the fact that the two, simultaneously-generated beams are focused at different points in space or different distances from the lens 20.

Figure 4:
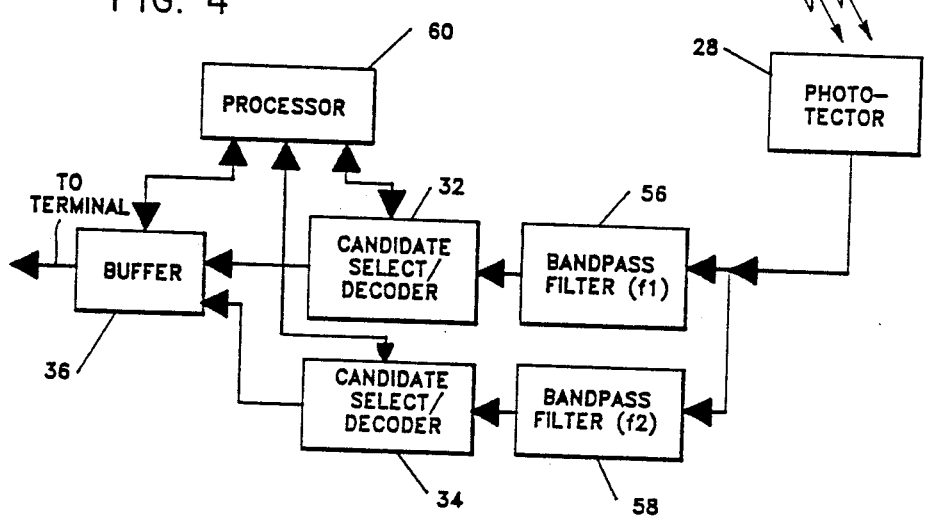
FIG. 4 is a block diagram of the signal processing circuitry for detecting and decoding reflected optical energy.

The energy in the scanning beam which actually strikes an object being scanned is equal to the sum of the optical energy in both beams 11B and 13B. The light reflected from an object being scanned includes components attributable to both of those beams. Referring to FIG. 4, the reflected optical energy is sensed by a single photodetector 28. The output of photodetector 28 is an electrical signal which varies as a direct function of the optical signal sensed by the photodetector. The electrical signal thus has components attributable to each of the laser beams 11B and 13B.

To separate the composite electrical signal into two simple signals, frequency detection techniques are preferably employed. The composite signal is applied both to a first bandpass filter 56 having a center frequency of f1 and a second bandpass filter 58 having a center frequency of f2. In accordance with conventional frequency modulation-demodulation techniques, the frequencies f1 and f2 differ enough that the bandpasses do not overlap. The outputs of the filters 56 and 58 are applied to the separate candidate select/decoder circuits 32 and 34 which both operate under the control of a processor 60. Similarly, the outputs of the decoder circuits 32 and 34 are applied to the single buffer 36 which also operates under the control of processor 60.

In essence, the frequency modulation/demodulation techniques and the focusing techniques which are employed allow the scanner to generate and employ multiple, simultaneous scan patterns in which corresponding scan lines are focused at different points in space. The system also separates and separately decodes any signals which might be attributed to any one of the simultaneously generated scan lines.

Figure 5:
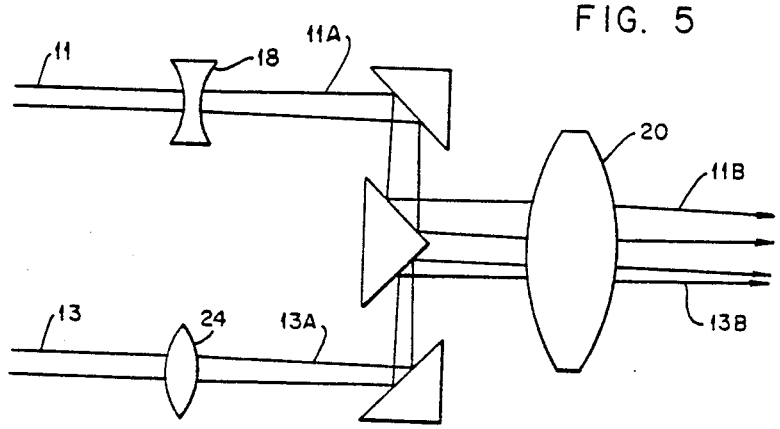
FIG. 5 is a schematic diagram of an alternate form of optical system, which might be useful where conventional lasers are used as light sources.

As indicated earlier, a preferred embodiment of the present invention employs semiconductor lasers which may be placed in close physical proximity. It may also be possible to employ larger, conventional lasers and a binocular-type optical arrangement as shown in FIG. 5. The frequency modulation techniques employed must be suitable for such lasers. Electro-optical modulation techniques should be suitable for conventional lasers.

The foregoing description has assumed that only two laser beams would be generated and processed simultaneously. As a practical matter, three or more lasers could be used to produce a simultaneous scan pattern having three or more simultaneous scan lines, each focused at a different point in space. To do this, each of the laser beams would have to be modulated at its own unique frequency and focused at its own unique distance from the common optical element. Similarly, a bandpass filter would have to be added to detect optical energy attributable only to that laser beam. Thus, the use of three or more lasers is well within the scope of this invention.

While there have been described what are considered to be preferred embodiments of the invention, variations and modifications therein will occur to those skilled in the art once they learn of the basic inventive concepts. Therefore, it is intended that the appended claims shall be construed to include not only the preferred embodiments but all such variations and modifications as fall within the true spirit and scope of the invention.

We claim:

1. An article scanner comprising:
   means for generating a plurality of light beams, each having a predetermined characteristic;
   means for focusing each of the beams at a different, predetermined focal length;
   beam deflecting means in the path of said plurality of light beams for generating simultaneous scan lines, each of said simultaneously generated scan lines being focused in a plane at a different distance from said beam deflecting means;
   detector means for generating a single signal which varies in accordance with the total optical energy reflected from an article in the path of the scan lines;
   means for separating the single signal into a plurality of constituent signals as a function of the predetermined characteristic of each of the beams, each constituent signal varying as a function of the reflected optical energy produced by a given one of the plurality of light beams.

2. An article scanner as defined in claim 1 wherein said light beams generating means comprises:
   means for producing a plurality of physically separated coherent light beams; and
   means for modulating each of the light beams at a unique, predetermined frequency.

3. An article scanner as defined in claim 2 wherein said producing means comprises a plurality of independently driven, solid state lasers.

4. An article scanner as defined in claim 3 wherein said modulating means comprises a plurality of switching circuits, each of which switches one of said solid state lasers between a lasing and a non-lasing condition at one of the unique, predetermined frequencies.

5. An article scanner as defined in either of claims 2 or 4 wherein said focusing means further comprises:
   a plurality of separate lenses, each having a given focal length and being interposed in the path of one of the modulated beams;
   path changing means for redirecting the modulated beams along a central, generally common path; and
   an output lens having a given, positive focal length, said output lens being located in the central, generally common path.

6. An article scanner as defined in claim 5 wherein at least some of said plurality of separate lenses have positive focal lengths while the remainder have negative focal lengths.

7. An article as defined in claim 6 wherein said signal separating further comprises a plurality of electrical filter elements, each of said filter elements having a bandpass centered on one of the unique, predetermined frequencies.

8. An article scanner as defined in claim 7 further including a plurality of signal decoding circuits each having an input from one of said filter elements.

9. An article scanner as defined in claim 2 wherein said signal separating means further comprises a plurality of electrical filter elements, each of said filter elements having a bandpass centered on one of the unique, predetermined frequencies.

10. An article scanner as defined in claim 9 further including a plurality of signal decoding circuits, each having an input from one of said filter elements.

* * * * *